(12) United States Patent
Kachi et al.

(10) Patent No.: US 8,713,915 B2
(45) Date of Patent: May 6, 2014

(54) CATALYST OVERHEAT PREVENTION APPARATUS

(75) Inventors: Masahiro Kachi, Susono (JP); Shinya Kondo, Gotemba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 310 days.

(21) Appl. No.: 13/179,234

(22) Filed: Jul. 8, 2011

(65) Prior Publication Data

US 2012/0014410 A1    Jan. 19, 2012

(30) Foreign Application Priority Data

Jul. 13, 2010 (JP) ................... 2010-159088

(51) Int. Cl.
*F01N 11/00* (2006.01)

(52) U.S. Cl.
USPC ............. 60/277; 60/274; 60/285; 60/298; 60/299; 60/320

(58) Field of Classification Search
USPC ............. 60/274, 277, 285, 298, 299, 320
See application file for complete search history.

(56) References Cited

U.S. PATENT DOCUMENTS

2005/0120709 A1* 6/2005 Ichise et al. ............. 60/285
2011/0251779 A1 10/2011 Kachi et al.

FOREIGN PATENT DOCUMENTS

| JP | 2003343242 A | 12/2003 |
| JP | 2004-060563 A | 2/2004 |

* cited by examiner

*Primary Examiner* — Thomas Denion
*Assistant Examiner* — Jorge Leon, Jr.
(74) *Attorney, Agent, or Firm* — Gifford, Krass, Sprinkle, Anderson & Citkowski, P.C.

(57) ABSTRACT

A catalyst overheat prevention apparatus has a temperature obtaining portion that estimates a convergence temperature of a catalyst provided in the exhaust system of an internal combustion engine and the present temperature of the catalyst. The catalyst overheat prevention apparatus also has a fuel increment calculation portion, a comparison portion, a correction portion, and a fuel increment setting portion, which are used to execute OT fuel increase control when the convergence temperature and present catalyst temperature obtained by the temperature obtaining portion are equal to or higher than an OT determination temperature. The catalyst overheat prevention apparatus also has a present temperature correction portion that corrects the present catalyst temperature to be equal to the OT determination temperature when the present catalyst temperature is equal to or higher than the OT determination temperature and the convergence temperature is equal to the OT determination temperature.

10 Claims, 9 Drawing Sheets

US 8,713,915 B2

CATALYST OVERHEAT PREVENTION APPARATUS

CROSS-REFERENCE TO RELATED APPLICATIONS

This application claims priority to Japanese Patent Application No. 2010-159088 filed on Jul. 13, 2010, which is incorporated herein by reference in its entirety including the specification, drawings and abstract.

BACKGROUND OF THE INVENTION

1. Field of the Invention

The invention relates to a catalyst overheat prevention apparatus.

2. Description of the Related Art

A catalyst for purifying exhaust gas is provided in an internal combustion engine (will hereinafter be referred to as "engine"). The purification capacity of such a catalyst may decrease when the catalyst is overheated by, for example, high-temperature exhaust gas. More specifically, such a decrease in the purification capacity of a catalyst may be caused by, for example, the temperature of the catalyst increasing beyond its activation temperature. In order to maintain a desired purification capacity of a catalyst, control is executed in which the fuel injection amount is increased so that the exhaust gas temperature decreases due to the vaporization heat of fuel and thus the catalyst is cooled down. Such fuel injection amount increase control will hereinafter be referred to as "OT (Over-Temperature Protection) fuel increase control", and the amount by which the fuel injection amount is increased in OT fuel increase control will hereinafter be referred to as "OT fuel increment". It is to be noted that OT fuel increase control is an example of control for preventing overheating of a catalyst (catalyst overheat prevention control).

Japanese Patent Application Publication No. 2003-343242 describes a technique of estimating the temperature of a catalyst in accordance with the engine speed and the engine load and then determining, based on the estimated temperature of the catalyst, whether the catalyst is presently overheated (will hereinafter be referred to as "OT determination").

However, when OT fuel increase control is being executed, the fuel injection amount may be increased excessively, resulting in an increase in the exhaust emissions, such as CO (carbon oxide) and HC (hydrocarbon) and a reduction of the fuel economy, as will hereinafter be described in more detail with reference to FIGS. 9A and 9B. FIG. 9A illustrates, by way of example, a relation between time and the temperature of a catalyst, and FIG. 9B illustrates, by way of example, a relation between time and the OT fuel increment. In FIGS. 9A and 9B, the horizontal axis represents time. The vertical axis in FIG. 9A represents the catalyst temperature, and the vertical axis in FIG. 9B represents the OT fuel increment. In FIG. 9A, the broken line represents a convergence temperature T1 of the catalyst, the dotted line represents a present temperature T2 of the catalyst, and the solid line represents an actual temperature T4 of the catalyst. In FIG. 9B, the broken line represents an OT fuel increase control base value D1 and the solid line represents an OT fuel increase control correction factoring-in value D2. FIGS. 9A and 9B illustrate a state where an excess air ratio λ is 1, that is, a state where the engine is running at the stoichiometric air-fuel ratio.

The OT fuel increase control can be executed when the convergence temperature T1 of the catalyst and the present temperature T2 of the catalyst are equal to or higher than an OT determination temperature T3. Note that "convergence temperature" is the temperature on which the temperature of the exhaust system converges when the engine is running with a given amount of intake air and at a given speed, and "present temperature" is the temperature of the catalyst that is determined through, for example, moderating based on the convergence temperature. Further, note that "OT determination temperature" is a reference temperature used in determining whether the catalyst is presently overheated. That is, when the present temperature is equal to or higher than the OT determination temperature, it is determined that the catalyst is presently overheated. With regard to the determination as to whether to execute the OT fuel increase control (will hereinafter be referred to as "OT fuel increase control execution determination"), the OT determination temperature T3 has a hysteretic characteristic with respect to the convergence temperature T1. That is, when the convergence temperature T1 and the OT determination temperature T3 are compared with each other in the OT fuel increase control execution determination, the OT determination temperature T3 is used if the vehicle is accelerating, and a hysteretic OT determination temperature T3' that has a hysteretic characteristic and is lower than the OT determination temperature T3 is used if the vehicle is decelerating.

The convergence temperature T1 and the present temperature T2 start increasing at time t1 in response to the start of acceleration of the vehicle. Then, at time t2, a situation occurs where the convergence temperature T1 and the present temperature T2 are both equal to or higher than the OT determination temperature T3, and therefore the OT fuel increase control is started. For example, the OT fuel increase control is executed such that the temperature of the catalyst decreases down to the OT determination temperature T3. Thus, the actual temperature T4 of the catalyst is reduced to the OT determination temperature T3. Then, at time t3, the convergence temperature T1 starts decreasing in response to the start of deceleration of the vehicle. At this time, the actual temperature T4 also starts decreasing and then becomes lower than the OT determination temperature T3. As such, normally, the OT fuel increase control is finished at time t3.

However, the OT fuel increase control is finished in response to the present temperature T2 becoming lower than the OT determination temperature T3 or in response to the convergence temperature T1 becoming lower than the hysteretic OT determination temperature T3'. Thus, the OT fuel increase control is finished at time t5. That is, the time at which the OT fuel increase control is finished is delayed from time t3 to time t5. This delay occurs due to the deviation of the present temperature T2 from the actual temperature T4 at time t3 at which the vehicle starts decelerating, which deviation has been caused as a result of execution of the OT fuel increase control. Further, due to such a deviation of the present temperature T2 from the actual temperature T4, the time at which the OT fuel increase control is started is advanced from time t7 to time t6 when the vehicle is accelerating again after accelerating and decelerating repeatedly, and also the time at which the OT fuel increase control is thereafter finished is delayed from time t8 to time t10 when the vehicle is decelerating again. As such, surplus fuel of an amount corresponding to the hatched regions shown in FIG. 9B is consumed at the time of executing the OT fuel increase control.

SUMMARY OF THE INVENTION

The invention provides a catalyst overheat prevention apparatus capable of optimizing the timing of catalyst overheat prevention control.

An aspect of the invention relates to a catalyst overheat prevention apparatus having: a convergence temperature estimation portion that estimates a convergence temperature on which a temperature of a catalyst provided in an exhaust system of an internal combustion engine converges; a catalyst temperature estimation portion that estimates the temperature of the catalyst; a catalyst overheat prevention portion that executes control for preventing overheating of the catalyst when the convergence temperature estimated by the convergence temperature estimation portion and the catalyst temperature estimated by the catalyst temperature estimation portion are equal to or higher than a determination value; and an estimated catalyst temperature correction portion that corrects the estimated catalyst temperature to be equal to the determination value when the estimated catalyst temperature is equal to or higher than the determination value and the estimated convergence temperature is equal to the determination value.

The catalyst overheat prevention apparatus described above may be structured such that the catalyst overheat prevention portion calculates a control amount for the control based on the catalyst temperature that has been estimated by the catalyst temperature estimation portion without being corrected by the estimated catalyst temperature correction portion.

According to the invention, thus, it is possible to optimize the timing of catalyst overheat prevention control.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EXAMPLE EMBODIMENTS

Hereinafter, the example embodiments of the invention will be described with reference to the accompanying drawings.

Figure 1:
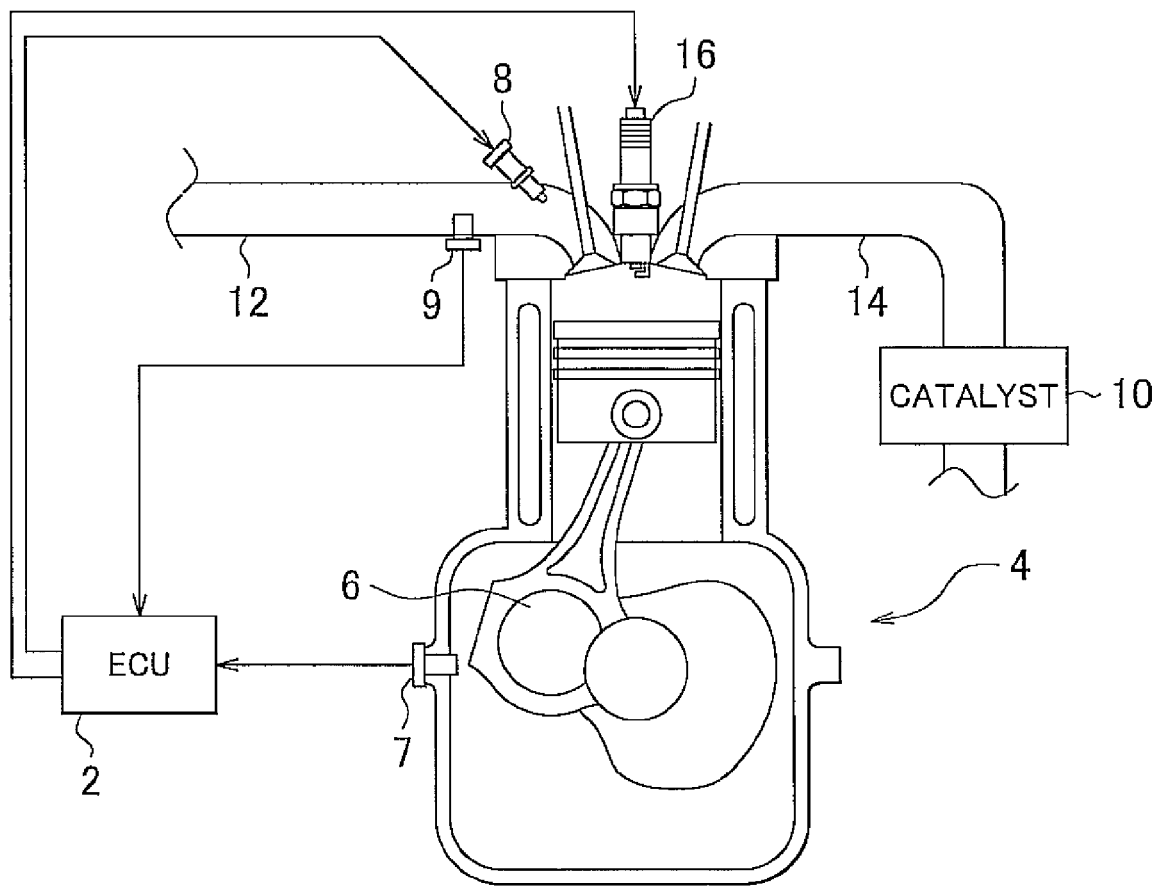
FIG. 1 is a view schematically showing an engine incorporating the catalyst overheat prevention apparatus of the first example embodiment.

First, the configuration of a catalyst overheat prevention apparatus will be described. FIG. 1 is a view schematically showing, by way of example, an engine incorporating a catalyst overheat prevention apparatus according to the first example embodiment.

Referring to FIG. 1, the engine is provided with an ECU (Engine Control Unit) 2, an engine body 4, a crankshaft 6, a crank angle sensor 7, a fuel injection valve 8, an intake sensor 9, a catalyst 10, an intake passage 12, an exhaust passage 14, and an ignition plug 16.

The fuel injection valve 8, the intake passage 12, the exhaust passage 14, and the ignition plug 16 are provided at the engine body 4. The crank angle sensor 7 is provided at a cylinder in the engine body 4 and detects the angle of the crankshaft 6 (crank angle). The fuel injection valve 8 and the intake sensor 9 are provided in the intake passage 12. The fuel injection valve 8 injects fuel, and the intake sensor 9 detects the amount of intake air dawn into the engine body 4 via the intake passage 12. The catalyst 10 is provided in the exhaust passage 14 and purifies the exhaust gas discharged from the engine body 4. The ECU 2 obtains the crank angle detected by the crank angle sensor 7 and the intake air amount detected by the intake sensor 9. Further, the ECU 2 controls the fuel injection from the fuel injection valve 8 and the firing of the ignition plug 16.

Figure 2:
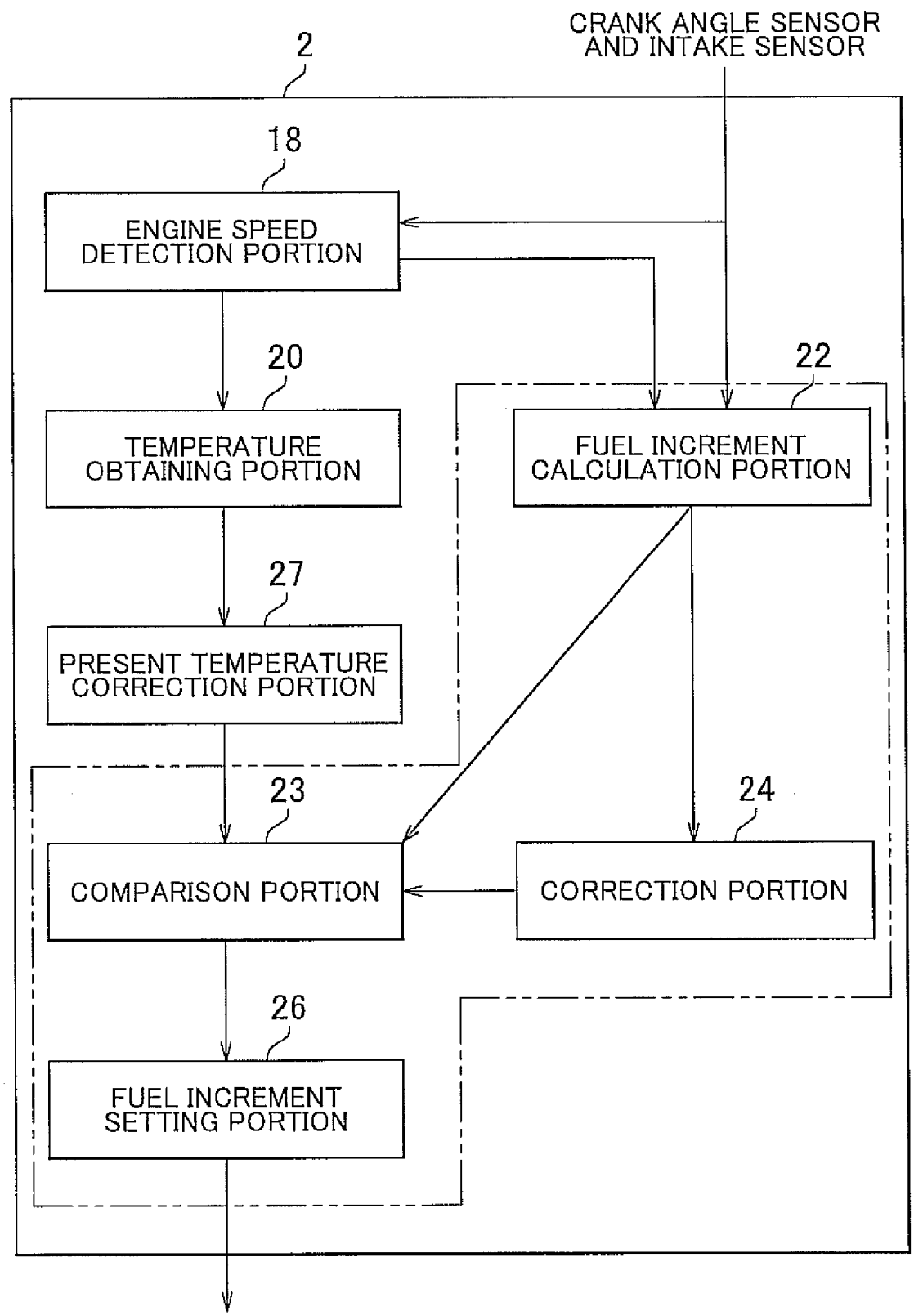
FIG. 2 is a diagram showing, by way of example, the function blocks of the catalyst overheat prevention apparatus of the first example embodiment.

FIG. 2 is a diagram showing, by way of example, the function blocks of the catalyst overheat prevention apparatus of the first example embodiment. Referring to FIG. 2, the ECU 2 functions as an engine speed detection portion 18, a temperature obtaining portion 20, a fuel increment calculation portion 22, a comparison portion 23, a correction portion 24, a fuel increment setting portion 26, and a present temperature correction portion 27.

The engine speed detection portion 18 obtains the crank angle detected by the crank angle sensor 7 and detects the engine speed from the crank angle. The temperature obtaining portion 20 obtains (estimates) a convergence temperature $T1$ of the catalyst 10 and a temperature (will hereinafter be referred to as "present temperature") $T2$ of the catalyst 10 based on the intake air amount detected by the intake sensor 9 and the engine speed detected by the engine speed detection portion 18. The present temperature $T2$ is determined through, for example, moderating based on the convergence temperature $T1$. The convergence temperature $T1$ corresponds to "estimated convergence temperature", and the present temperature $T2$ corresponds to "estimated catalyst temperature". The temperature obtaining portion 20 corresponds to "convergence temperature estimation portion" and "catalyst temperature estimation portion".

The fuel increment calculation portion 22 calculates an OT fuel increment that is the amount of fuel that should be additionally injected from the fuel injection valve 8 during OT fuel increase control, based on the intake air amount and the engine speed. The value calculated by the fuel increment calculation portion 22 will be referred to as "OT fuel increase control base value" (first fuel increment). The OT fuel increase control base value is set to, for example, a value that reduces the temperature of the catalyst 10 from the convergence temperature T1 to an OT determination temperature T3, which will be described in detail later. The comparison portion 23 compares the convergence temperature, the present temperature, and the OT determination temperature, which will be described later, with each other, and compares the OT fuel increase control base value and an OT fuel increase control correction factoring-in value with each other.

The correction portion 24 calculates the OT fuel increase control correction factoring-in value (second fuel increment) by correcting the OT fuel increase control base value, which has been calculated by the fuel increment calculation portion 22, based on the convergence temperature and the present temperature, which have been obtained by the temperature obtaining portion 20. The fuel increment setting portion 26 selects either of the OT fuel increase control base value and the OT fuel increase control correction factoring-in value as the final OT fuel increment, based on the convergence temperature, the present temperature, the OT fuel increase control base value, and the OT fuel increase control correction factoring-in value. That is, fuel of an amount that has been increased by the OT fuel increment set by the fuel increment setting portion 26 is injected from the fuel injection valve 8, as will be described in detail later. It is to be noted that the fuel increment calculation portion 22, the comparison portion 23, the correction portion 24, and the fuel increment setting portion 26 correspond to "catalyst overheat prevention portion" that executes "control for preventing overheating of the catalyst", and the OT fuel increment corresponds to "control amount for the control".

The present temperature correction portion 27 corrects the present temperature to be equal to the OT determination temperature, which will be described later. Specifically, the present temperature correction portion 27 corrects the present temperature to be equal to the OT determination temperature when the convergence temperature and the present temperature are both equal to or higher than the OT determination temperature. More specifically, the present temperature correction portion 27 corrects the present temperature to be equal to the OT determination temperature in at least one of a case where the OT fuel increase control correction factoring-in value is larger than the OT fuel increase control base value and a case where the present temperature is higher than the convergence temperature. Further, the present temperature correction portion 27 corrects the present temperature to be equal to the OT determination temperature when the vehicle is decelerating. It is to be noted that the present temperature correction portion 27 corresponds to "estimated catalyst temperature correction portion".

Figure 3:
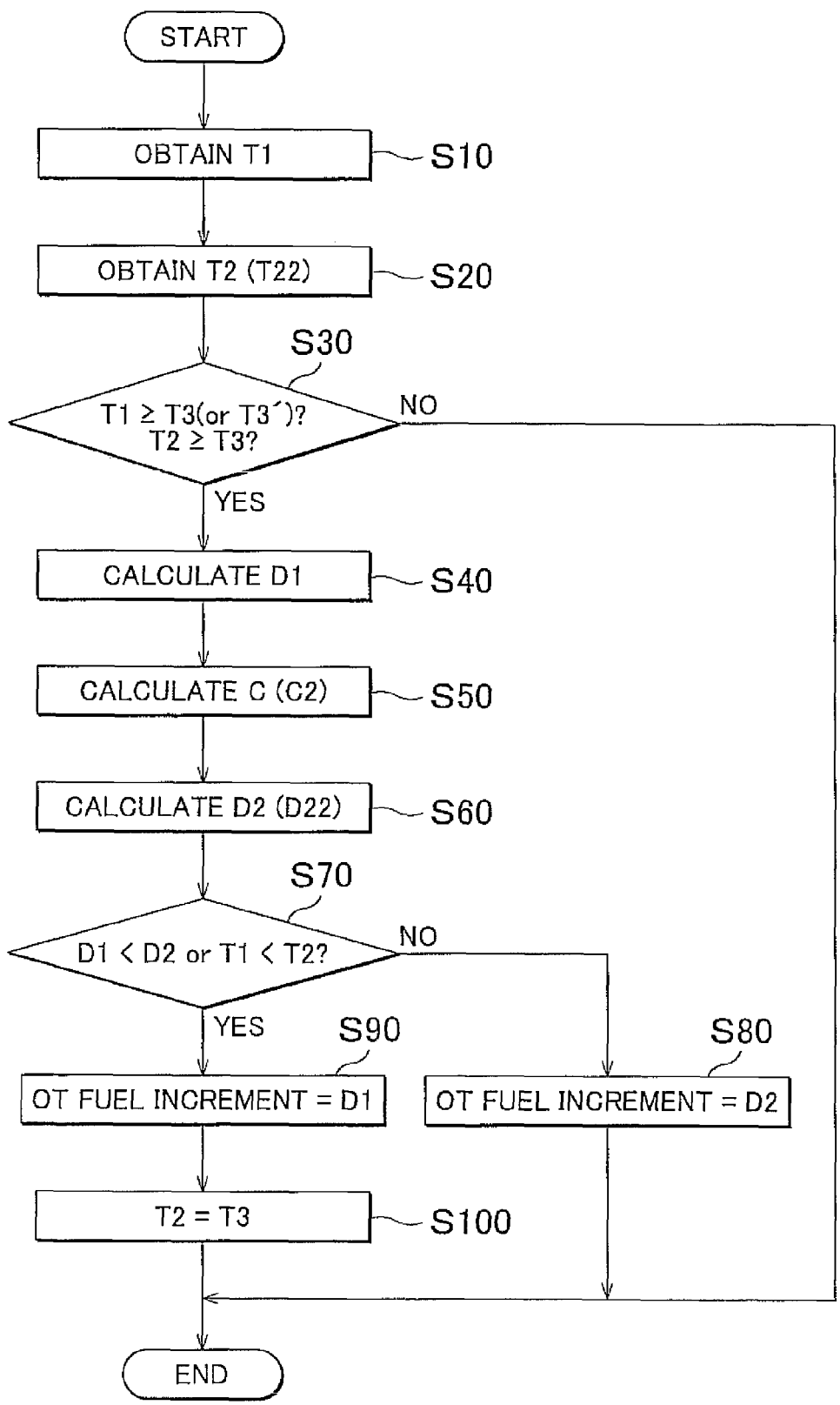
FIG. 3 is a flowchart illustrating, by way of example, the control executed by the catalyst overheat prevention apparatus of the first example embodiment.

FIG. 3 is a flowchart illustrating, by way of example, the control executed by the catalyst overheat prevention apparatus of the first example embodiment.

Referring to FIG. 3, first, the temperature obtaining portion 20 obtains the convergence temperature T1 of the catalyst 10 based on the intake air amount detected by the intake sensor 9 and the engine speed detected by the engine speed detection portion 18 (step S10). Specifically, the temperature obtaining portion 20 calculates the engine load from the intake air amount and estimates the convergence temperature T1 based on the engine load and the engine speed. After step S10, the temperature obtaining portion 20 obtains the present temperature T2 of the catalyst 10 (step S20). The present temperature T2 is calculated (estimated) using the equation (1) indicated below. Note that "n" in the expression (1) represents the number of times moderating is performed. The temperature obtaining portion 20 can calculate, as the present temperature T2, a first present temperature T21 not factoring in the correction by the present temperature correction portion 27 and a second present temperature T22 factoring in the correction by the present temperature correction portion 27. Note that the temperature obtaining portion 20 estimates the second present temperature T22 as the present temperature T2.

$$T2=T2+(T1-T2)/n \qquad (1)$$

After step S20, the comparison portion 23 determines whether the convergence temperature T1 and the present temperature T2 that have been obtained by the temperature obtaining portion 20 are equal to or higher than the OT determination temperature T3, which has been set in advance (step S30). The OT determination temperature is a reference temperature used in determining whether the catalyst 10 is presently overheated. That is, if the present temperature is equal to or higher than the OT determination temperature, it is determined that the catalyst 10 is presently overheated. Note that the process in step S30 is a process for OT fuel increase control execution determination. For this reason, a hysteretic OT determination temperature T3' is used for the convergence temperature T1 during deceleration, in place of the OT determination temperature T3. In the first example embodiment, the OT determination temperature T3 that is commonly used for the convergence temperature T1 and the present temperature T2 corresponds to "determination value" used in "the control for preventing overheating of the catalyst" that is executed by "catalyst overheat prevention portion".

If "No" in step S30, the control is finished. That is, in this case, the catalyst 10 is not presently overheated, and therefore it is not necessary to execute the OT fuel increase control. On the other hand, if "Yes" in step S30, the fuel increment calculation portion 22 calculates an OT fuel increase control base value D1 based on the intake air amount and the engine speed (step S40). More specifically, the fuel increment calculation portion 22 calculates the engine load from the intake air amount and then calculates the OT fuel increase control base value D1 based on the engine load and the engine speed.

After step S40, the correction portion 24 calculates a correction coefficient C that is used to correct the OT fuel increase control base value D1 (step S50). The correction coefficient C is calculated using the equation (2) indicated below. The correction portion 24 can calculate, as the correction coefficient C, a first correction coefficient C1 that is used when the first present temperature T21 is used as the present temperature T2 and a second correction coefficient C2 that is used when the second present temperature T22 is used as the present temperature T2. However, note that the correction portion 24 calculates the second correction coefficient C2 as the correction coefficient C. The correction coefficient C takes a value from 0 to 1, and it is regarded as 1 when larger than 1.

$$C=(T2-T3)/(T1-T3) \qquad (2)$$

After step S50, the correction portion 24 calculates an OT fuel increase control correction factoring-in value D2 based on the OT fuel increase control base value D1 and the correction coefficient C (step S60). The OT fuel increase control correction factoring-in value D2 is calculated using the equation (3) indicated below. The correction portion 24 can calculate, as the OT fuel increase control correction factoring-in value D2, a first OT fuel increase control correction factoring-in value D21 that is used when the first correction coefficient C1 is used as the correction coefficient C and a second OT fuel increase control correction factoring-in value D22 that is used when the second correction coefficient C2 is used as the correction coefficient C. However, note that the correction portion 24 calculates the second OT fuel increase control correction factoring-in value D22 as the OT fuel increase control correction factoring-in value D2.

$$D2 = C \times D1 \quad (3)$$

After step S60, the comparison portion 23 determines whether the OT fuel increase control correction factoring-in value D2 is larger than the OT fuel increase control base value D1 and whether the present temperature T2 is higher than the convergence temperature T1 (step S70). If "No" in step S70, the fuel increment setting portion 26 sets the OT fuel increment to the OT fuel increase control correction factoring-in value D2 (step S80). That is, if the present temperature T2 is equal to or lower than the convergence temperature T1 and the OT fuel increase control correction factoring-in value D2 is equal to or smaller than the OT fuel increase control base value D1, the fuel increment setting portion 26 sets the OT fuel increment to the OT fuel increase control correction factoring-in value D2.

On the other hand, if "Yes" in step S70, the fuel increment setting portion 26 sets the OT fuel increment to the OT fuel increase control base value D1 (step S90). That is, in at least one of a case where the present temperature T2 is higher than the convergence temperature T1 and a case where the OT fuel increase control correction factoring-in value D2 is larger than the OT fuel increase control base value D1, the fuel increment setting portion 26 sets the OT fuel increment to the OT fuel increase control base value D1. Further, if "Yes" in step S70, the present temperature correction portion 27 corrects the present temperature T2 to be equal to the OT determination temperature T3 (step S100). After step S100, the control is finished.

Figure 4A:
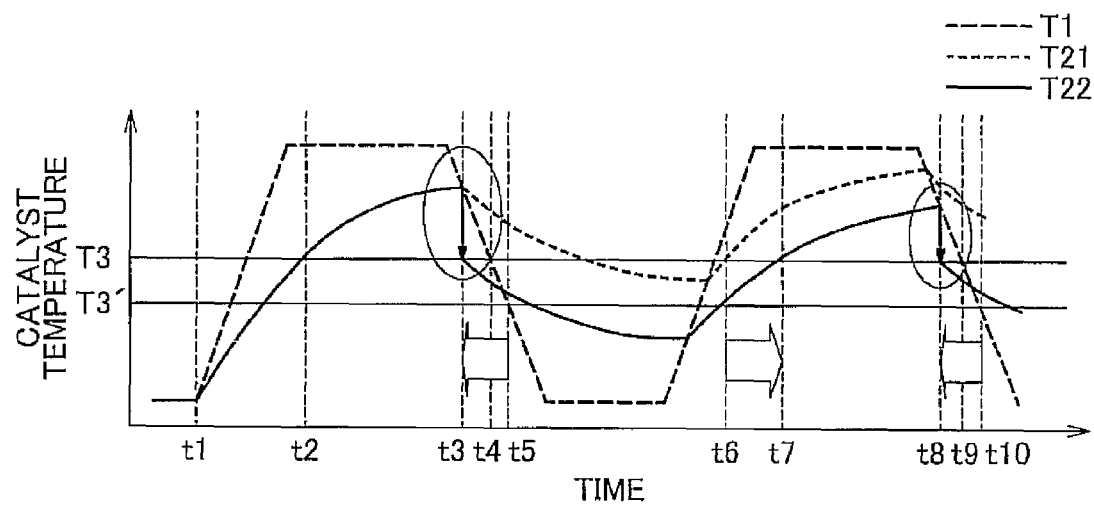
FIG. 4A is a timing chart illustrating, by way of example, a relation between time and the catalyst temperature.
Figure 4B:
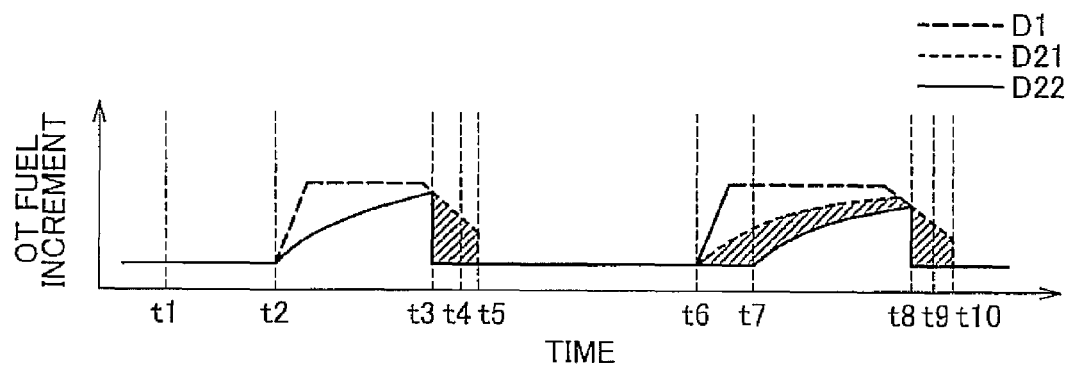
FIG. 4B is a timing chart illustrating, by way of example, a relation between time and the OT fuel increment.
Figure 9A:
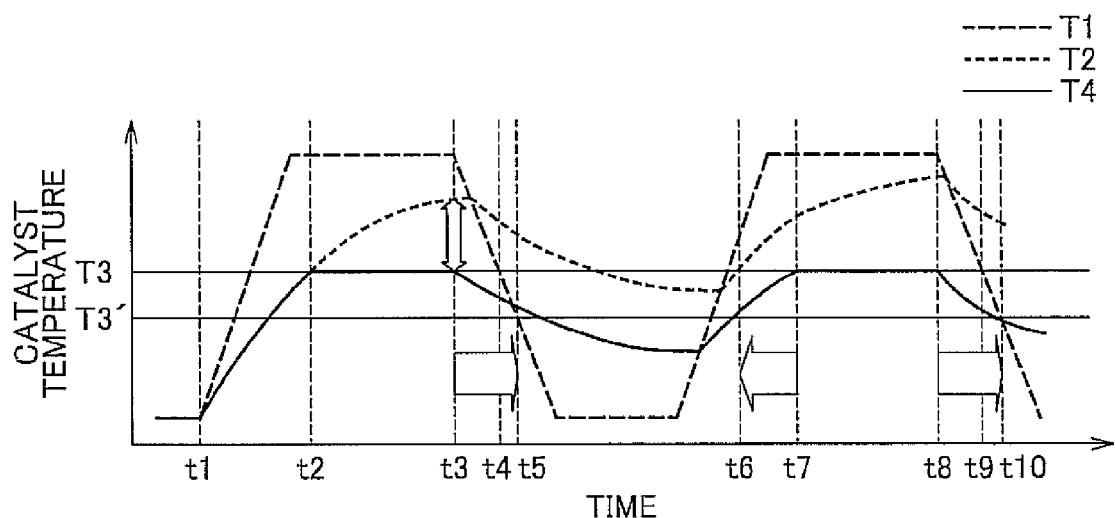
FIG. 9A is a timing chart illustrating, by way of example, a relation between time and the catalyst temperature, which is found when related-art OT fuel increase control is executed.
Figure 9B:
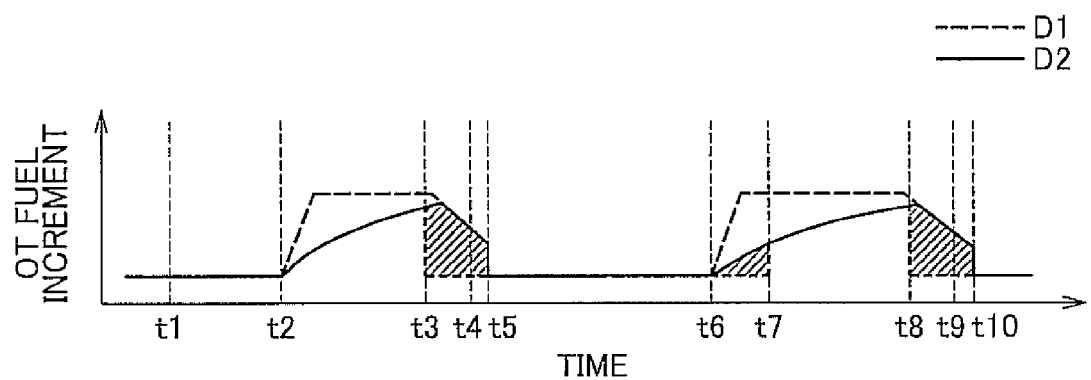
FIG. 9B is a timing chart illustrating, by way of example, a relation between time and the OT fuel increment, which is found when the related-art OT fuel increase control is executed.

Next, the flow of the above-described control will be described with reference to the timing charts of FIGS. 4A and 4B, by way of example. FIG. 4A illustrates, by way of example, a relation between time and the catalyst temperature, and FIG. 4B illustrates, by way of example, a relation between time and the OT fuel increment. In FIG. 4A, the broken line represents the convergence temperature T1, the dotted line represents the first present temperature T21, and the solid line represents the second present temperature T22. In FIG. 4B, the broken line represents the OT fuel increase control base value D1, the dotted line represents the first OT fuel increase control correction factoring-in value D21, and the solid line represents the second OT fuel increase control correction factoring-in value D22. Note that the first present temperature T21 and the first OT fuel increase control correction factoring-in value D21 correspond, respectively, to the catalyst temperature and the OT fuel increment used in the related-art OT fuel increase control described above with reference to FIGS. 9A and 9B, and they are indicated in FIGS. 4A and 4B for comparative reference only. Further, note that FIGS. 4A and 4B illustrate a state where an excess air ratio λ is 1, that is, a state where the engine is running at the stoichiometric air-fuel ratio.

Referring to FIG. 4A, the second present temperature T22 starts increasing at time t1 and becomes higher than the OT determination temperature T3 at time t2. At this time, the convergence temperature T1 and the second present temperature T22 are both higher than the OT determination temperature T3. That is, the result of the determination in step S30 in FIG. 3 is "Yes" from time t2. Referring to FIG. 4B, the fuel increment calculation portion 22 calculates the OT fuel increase control base value D1 (step S40 in FIG. 3). For example, the OT fuel increase control base value D1 is set such that the temperature of the catalyst 10 can be reduced from the convergence temperature T1 to the OT determination temperature T3 through injection of fuel of an amount that is increased by the OT fuel increase control base value D1 as the OT fuel increment.

However, if the OT fuel increase control base value D1 is used as the OT fuel increment, the fuel injection amount may become excessively large. That is, in a case where the second present temperature T22 is lower than the convergence temperature T1, if the OT fuel increase control base value D1 is used as the OT fuel increment, the fuel injection amount becomes excessively large. When the fuel injection amount is excessively large, the catalyst 10 may be cooled down to a temperature lower than the activation temperature of the catalyst 10. Such excessive cooling of the catalyst 10 may cause an increase in the exhaust emissions, and such excessive fuel injection may reduce the fuel economy.

In order to cope with the problem stated above, as shown in FIG. 4B, the correction portion 24 calculates the second OT fuel increase control correction factoring-in value D22 (step S60 in FIG. 3). Since the second OT fuel increase control correction factoring-in value D22 is smaller than the OT fuel increase control base value D1, using the second OT fuel increase control correction factoring-in value D22 as the OT fuel increment prevents the fuel injection amount from becoming excessively large (step S80 in FIG. 3).

However, it should be noted that, in some cases, the fuel injection amount may become excessively large if the second OT fuel increase control correction factoring-in value D22 is used as the OT fuel increment. More specifically, the convergence temperature T1 and the OT fuel increase control base value D1 tend to decrease as the engine speed decreases and as the engine load decreases. That is, for example, when the vehicle is decelerating, the convergence temperature T1 is low and the OT fuel increase control base value D1 is small. For this reason, in the example illustrated in FIGS. 4A and 4B, the convergence temperature T1 estimated by the temperature obtaining portion 20 becomes lower than the second present temperature T22 at time t3. This is because the vehicle is decelerating and thus the engine speed has decreased. Further, at time t3, the OT fuel increase control base value D1 is also decreasing as shown in FIG. 4B.

At this time, the second OT fuel increase control correction factoring-in value D22 calculated by the correction portion 24 using the equation (2) is larger than before time t3. If the second OT fuel increase control correction factoring-in value D22 is that large and is used as the OT fuel increment, the fuel injection amount will be excessively large. In this case, therefore, the fuel increment setting portion 26 sets the OT fuel increment to the OT fuel increase control base value D1, not the second OT fuel increase control correction factoring-in value D22 (step S90 in FIG. 3). Since the OT fuel increase control base value D1 is smaller than the second OT fuel increase control correction factoring-in value D22, the fuel injection amount is set small.

As described above, the catalyst overheat prevention apparatus of the first example embodiment uses the second OT fuel increase control correction factoring-in value D22 as the OT fuel increment in a case where the fuel injection amount will be excessively large if the OT fuel increase control base value D1 is used as the OT fuel increment, and uses the OT fuel increase control base value D1 as the OT fuel increment in a case where the fuel injection amount will be excessively large if the second OT fuel increase control correction factoring-in value D22 is used as the OT fuel increment. Thus, the catalyst overheat prevention apparatus of the first example embodiment prevents the fuel injection amount from becoming excessively large by changing the OT fuel increment and thereby accomplishes appropriate control of the OT fuel increment. In this way, the catalyst overheat prevention apparatus of the first example embodiment prevents or minimizes an increase in the exhaust emissions and a reduction of the fuel economy.

Referring to FIG. 4A, the second present temperature T22 becomes higher than the convergence temperature T1 at time t3. Further, referring to FIG. 4B, the second OT fuel increase control correction factoring-in value D22 becomes larger than the OT fuel increase control base value D1 at time t3. At this time, the present temperature correction portion 27 corrects the second present temperature T22 to be equal to the OT determination temperature T3 (step S100 in FIG. 3). By thus correcting the second present temperature T22 at time t3, the deviation of the second present temperature T22 from the actual temperature of the catalyst 10 can be reduced while appropriately controlling the OT fuel increment.

The OT fuel increase control is finished in response to the second present temperature T22 becoming lower than the OT determination temperature T3 or in response to the convergence temperature T1 becoming lower than the hysteretic OT determination temperature T3'. Thus, the OT fuel increase control is finished in response to the second present temperature T22 becoming lower than the OT determination temperature T3 at time t3 (step S30 in FIG. 3). In this way, the delay in finishing the OT fuel increase control is reduced as schematically indicated by the arrow in FIG. 4A, and thus the timing of the OT fuel increase control is optimized. That is, the OT fuel increase control is finished at time t5 if the OT fuel increase control is executed using the first present temperature T21 and the first OT fuel increase control correction factoring-in value D21, which are indicated, respectively, by the dotted lines in FIGS. 4A and 4B for comparative reference. On the other hand, in the case of the catalyst overheat prevention apparatus of the first example embodiment, the time at which the OT fuel increase control is finished is time t3 that is earlier than time t5. As a result, as shown in FIG. 4B, the surplus fuel amount corresponding to the hatched region between time t3 and time t5 can be saved at the time of executing the OT fuel increase control.

Referring to FIG. 4A, since the deviation of the second present temperature T22 from the actual temperature of the catalyst 10 is reduced at time t3, at time t7, a situation occurs where the convergence temperature T1 and the second present temperature T22 are both equal to or higher than the OT determination temperature T3, and therefore the OT fuel increase control is restarted (step S30 in FIG. 3). Thus, as schematically indicated by the arrow in FIG. 4A, it is possible to prevent the OT fuel increase control from being started too early even when the vehicle is accelerating again after accelerating and decelerating repeatedly, whereby the timing of the OT fuel increase control is optimized. More specifically, in a case where the OT fuel increase control is executed using the first present temperature T21 and the first OT fuel increase control correction factoring-in value D21, the OT fuel increase control is started at time t6. On the other hand, in the case of the catalyst overheat prevention apparatus of the first example embodiment, the time at which the OT fuel increase control is started is time t7 that is later than time t6. As a result, as shown in FIG. 4B, the surplus fuel amount corresponding to the hatched region between time t6 and time t8 can be saved at the time of executing the OT fuel increment.

Referring to FIG. 4A, the second present temperature T22 becomes higher than the convergence temperature T1 at time t8. Further, referring to FIG. 4B, the second OT fuel increase control correction factoring-in value D22 becomes larger than the OT fuel increase control base value D1 at time t8. At this time, the present temperature correction portion 27 corrects the second present temperature T22 to be equal to the OT determination temperature T3. At time t8, further, the second present temperature T22 becomes lower than the OT determination temperature T3, and therefore the OT fuel increase control is finished. In this way, the time at which the OT fuel increase control is finished is advanced from time t10 to time t8. That is, as schematically indicated by the arrow in FIG. 4A, the delay in finishing the OT fuel increase control can be reduced also when the vehicle is decelerating again, and thus the timing of the OT fuel increase control is optimized. As a result, as shown in FIG. 4B, the surplus fuel amount corresponding to the hatched region between time t8 and time t10 can be saved at the time of executing the OT fuel increase control. As described above, the catalyst overheat prevention apparatus of the first example embodiment is capable of optimizing the timing of the OT fuel increase control.

In the above descriptions, a state where the vehicle is decelerating has been referred to as a state where the fuel injection amount will become excessively large if the OT fuel increase control correction factoring-in value D2 (i.e., the second OT fuel increase control correction factoring-in value D22) is used as the OT fuel increment. However, it should be noted that a state where the fuel injection amount will become excessively large if the OT fuel increase control correction factoring-in value D2 (i.e., the second OT fuel increase control correction factoring-in value D22) is used as the OT fuel increment is not limited to during deceleration of the vehicle. That is, whether or not the vehicle is decelerating, the OT fuel increment can be appropriately controlled by executing the control process in step S90 in FIG. 3 in various cases where the fuel injection amount will become excessively large if the OT fuel increase control correction factoring-in value D2 is used as the OT fuel increment.

While the comparison portion 23 determines whether the convergence temperature T1 and the present temperature T2 (i.e., the second present temperature T22) are equal to or higher than the OT determination temperature T3 in step S30 in FIG. 3 in the example described above, the comparison portion 23 may alternatively determine whether the convergence temperature T1 and the present temperature T2 are higher than the OT determination temperature T3. Further, while the comparison portion 23 determines whether the OT fuel increase control correction factoring-in value D2 (i.e., the second OT fuel increase control correction factoring-in value D22) is larger than the OT fuel increase control base value D1 in step S70 in FIG. 3 in the example described above, the comparison portion 23 may alternatively determine whether the OT fuel increase control correction factoring-in value D2 is equal to or larger than the OT fuel increase control base value D1. Further, while the comparison portion 23 determines whether the present temperature T2 (i.e., the second present temperature T22) is higher than the convergence temperature T1 in step S70 in FIG. 3 in the example described above, the comparison portion 23 may alternatively determine whether the present temperature T2 is equal to or higher than the convergence temperature T1. Note that such modifications may be made also to other determination steps in the flowcharts that will be referred to later.

Figure 5:
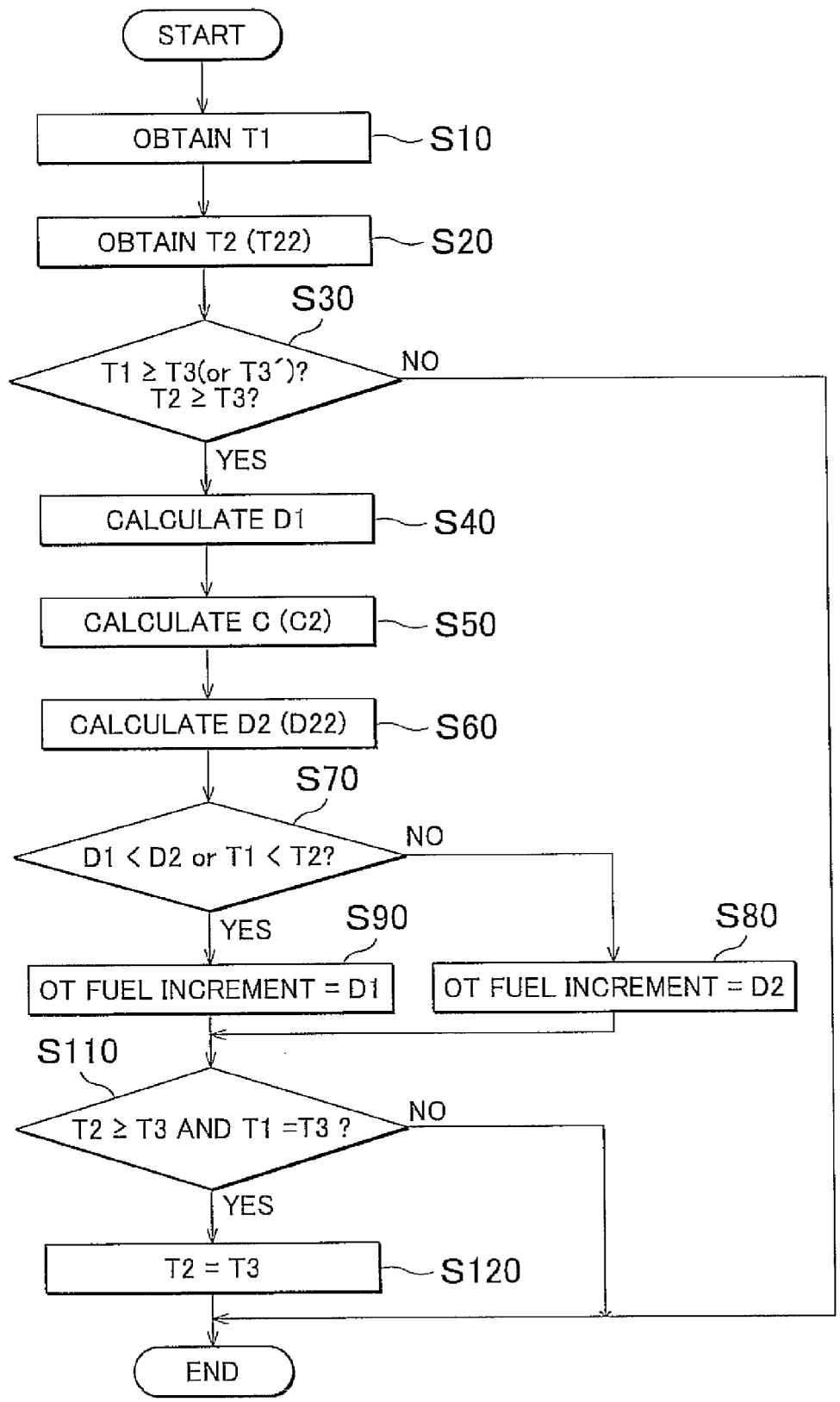
FIG. 5 is a flowchart illustrating, by way of example, the control executed by the catalyst overheat prevention apparatus of the second example embodiment.

Hereinafter, a catalyst overheat prevention apparatus according to the second example embodiment of the invention will be described. The configuration of the catalyst overheat prevention apparatus of the second example embodiment is the same as that of the catalyst overheat prevention apparatus of the first example embodiment, which is shown in FIGS. 1 and 2, but the control executed by the catalyst overheat prevention apparatus of the second example embodiment is different from the control executed by the catalyst overheat prevention apparatus of the first example embodiment, as described below. FIG. 5 is a flowchart illustrating, by way of example, the control executed by the catalyst overheat prevention apparatus of the second example embodiment. In the following, only the differences from the control illustrated by the flowchart of FIG. 3 will be described. Referring to the flowchart of FIG. 5, the control executed by the catalyst overheat prevention apparatus of the second example embodiment does not include step S100 but additionally includes steps S110 and S120 that are executed after step S80 or step S90.

After step S80 or step S90, the comparison portion 23 determines whether the present temperature T2 is equal to or higher than the OT determination temperature T3 and the convergence temperature T1 is equal to the OT determination temperature T3 (step S110). If "Yes", the present temperature correction portion 27 corrects the present temperature T2 to be equal to the OT determination temperature T3 (step S120). That is, in the second example embodiment, the present temperature correction portion 27 corrects the present temperature T2 to be equal to the OT determination temperature T3 when the present temperature T2 is equal to or higher than the OT determination temperature T3 and the convergence temperature T1 is equal to the OT determination temperature T3. Further, the present temperature correction portion 27 corrects the present temperature T2 to be equal to the OT determination temperature T3 when the vehicle is decelerating. Note that the second present temperature T22 is used as the present temperature T2. Further, note that the process in step S110 is not a process for OT fuel increase control execution determination, and therefore, in this step, the hysteretic OT determination temperature T3' is not used for the convergence temperature T1 in place of the OT determination temperature T3. The control is finished if "No" in step S110 or after step S120.

Figure 6A:
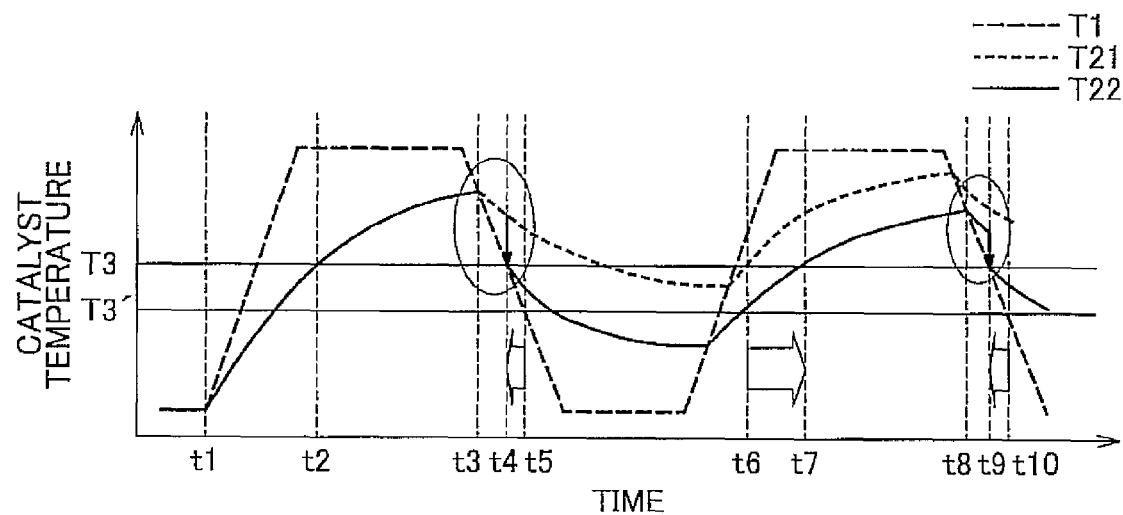
FIG. 6A is a timing chart illustrating, by way of example, a relation between time and the catalyst temperature.
Figure 6B:
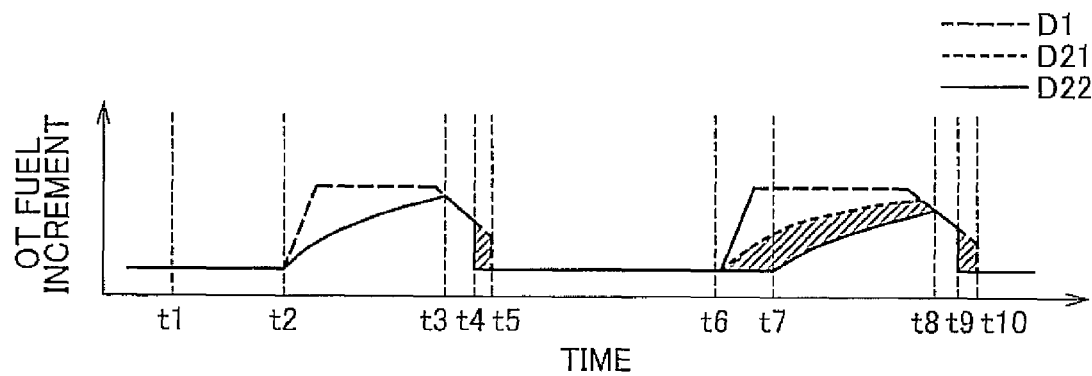
FIG. 6B is a timing chart illustrating, by way of example, a relation between time and the OT fuel increment.

Next, the flow of the above-described control will be described with reference to the timing charts of FIGS. 6A and 6B, by way of example. FIG. 6A illustrates, by way of example, a relation between time and the catalyst temperature, and FIG. 6B illustrates, by way of example, a relation between time and the OT fuel increment. As in FIGS. 4A and 4B, the first present temperature T21 and the first OT fuel increase control correction factoring-in value D21 are indicated in FIGS. 6A and 6B, respectively, for comparative reference only. In the following, only the differences from the timing charts of FIGS. 4A and 4B will be described.

At time t4, a situation occurs where the second present temperature T22 is equal to or higher than the OT determination temperature T3 and the convergence temperature T1 is equal to the OT determination temperature T3. At this time, the second present temperature T22 is corrected to be equal to the OT determination temperature T3 (step S120 in FIG. 5). By thus correcting the second present temperature T22 at time t4, the deviation of the second present temperature T22 from the actual temperature of the catalyst 10 can be reduced while controlling the OT fuel increment appropriately.

At time t4, further, the second present temperature T22 becomes lower than the OT determination temperature T3, and therefore the OT fuel increase control is finished (step S30 in FIG. 5). In this way, as schematically indicated by the arrow in FIG. 6A, the delay in finishing the OT fuel increase control is reduced, whereby the timing of the OT fuel increase control is optimized. More specifically, in the case of the catalyst overheat prevention apparatus of the second example embodiment, the time at which the OT fuel increase control is finished is advanced from time t5 to time t4. As a result, as shown in FIG. 6B, the surplus fuel amount corresponding to the hatched region between time t4 and time t5 can be saved at the time of executing the OT fuel increase control.

The OT fuel increase control is restarted at time t7 at which a situation occurs where the convergence temperature T1 and the second present temperature T22 are both equal to or higher than the OT determination temperature T3 (step S30 in FIG. 5). Thus, as schematically indicated by the arrow in FIG. 6A, it is possible to prevent the OT fuel increase control from being started too early even when the vehicle is accelerating again after accelerating and decelerating repeatedly, whereby the timing of the OT fuel increase control is optimized. More specifically, in the case of the catalyst overheat prevention apparatus of the second example embodiment, the time at which the OT fuel increase control is started is retarded from time t6 to time t7. As a result, as shown in FIG. 6B, the surplus fuel amount corresponding to the hatched region between time t6 and time t8 can be saved at the time of executing the OT fuel increase control.

Subsequently, at time t9, a situation occurs where the second present temperature T22 is equal to or higher than the OT determination temperature T3 and the convergence temperature T1 is equal to the OT determination temperature T3. At this time, the second present temperature T22 is corrected to be equal to the OT determination temperature T3 (step S120 in FIG. 5). At time t9, further, the second present temperature T22 becomes lower than the OT determination temperature T3, and therefore the OT fuel increase control is finished (step S30 in FIG. 5). In this way, the time at which the OT fuel increase control is finished is advanced from time t10 to time t9. That is, as schematically indicated by the arrow in FIG. 6A, the delay in finishing the OT fuel increase control is reduced also when the vehicle is decelerating again, and thus the timing of the OT fuel increase control is optimized. As a result, as shown in FIG. 6B, the surplus fuel amount corresponding to the hatched region between time t9 and time t10 can be saved at the time of executing the OT fuel increase control. As such, the catalyst overheat prevention apparatus of the second example embodiment is capable of optimizing the timing of the OT fuel increase control.

Figure 7:
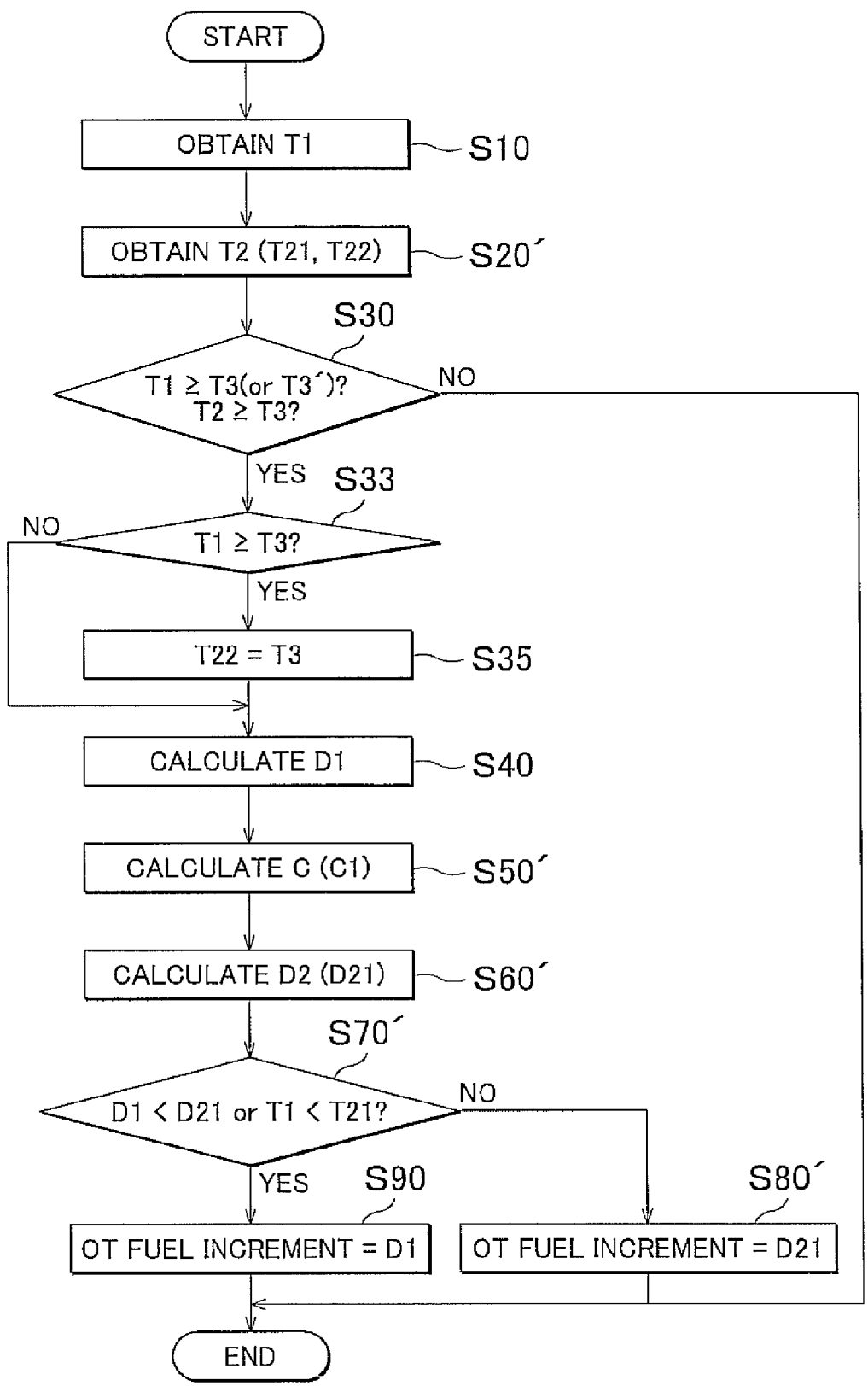
FIG. 7 is a flowchart illustrating, by way of example, the control executed by the catalyst overheat prevention apparatus of the third example embodiment.

Hereinafter, a catalyst overheat prevention apparatus according to the third example embodiment of the invention will be described. The configuration of the catalyst overheat prevention apparatus of the third example embodiment is the same as that of the catalyst overheat prevention apparatus of the first example embodiment, which is shown in FIGS. 1 and 2, but the control executed by the catalyst overheat prevention apparatus of the third example embodiment is different from the control executed by the catalyst overheat prevention apparatus of the first example embodiment. FIG. 7 is a flowchart illustrating, by way of example, the control executed by the catalyst overheat prevention apparatus of the third example embodiment. In the following, only the differences from the control illustrated by the flowchart of FIG. 3 will be described. Referring to the flowchart of FIG. 7, the control executed by the catalyst overheat prevention apparatus of the third example embodiment additionally includes steps S33 and S35 that are executed after step S30, and includes steps S20', S50', S60', S70', and S80' in place of steps S20, S50, S60, S70, and S80. Further, the control executed by the overheat prevention apparatus of the third example embodiment does not include step S100, as shown in the flowchart of FIG. 7.

After step S10, the temperature obtaining portion 20 obtains the first present temperature T21 and the second present temperature T22 as the present temperature T2 of the catalyst 10 (step S20'). More specifically, in the third example embodiment, the first present temperature T21 is estimated for OT fuel increase control correction (i.e., correction of the OT fuel increase control), and the second present temperature T22 is estimated for OT fuel increase control execution determination. Thus, in step S30 in which whether to execute the OT fuel increase control is determined, the second present temperature T22 is used as the present temperature T2. As mentioned above, in step S30, the hysteretic OT determination temperature T3' is used for the convergence temperature T1 in place of the OT determination temperature T3 when the vehicle is decelerating.

After step S30, the comparison portion 23 determines whether the convergence temperature T1 is equal to or higher than the OT determination temperature T3 (step S33). If "Yes", the present temperature correction portion 27 corrects the second present temperature T22 to be equal to the OT determination temperature T3 (step S35). If "No", the control proceeds to step S40.

That is, in the third example embodiment, when the convergence temperature T1 and the second present temperature T22 are both equal to or higher than the OT determination temperature T3 (if "Yes" in step S30), the present temperature correction portion 27 corrects the second present temperature T22 to be equal to the OT determination temperature T3. Then, if the convergence temperature T1 becomes lower than the OT determination temperature T3 (if "No" in step S33), the present temperature correction portion 27 finishes the correction of the second present temperature T22. Note that the process in step S33 is not a process for OT fuel increase control execution determination, and therefore the hysteretic OT determination temperature T3' is not used in place of the OT determination temperature T3 in this step.

In step S40, the correction portion 24 calculates the OT fuel increase control base value D1. Then, the correction portion 24 calculates the first correction coefficient C1 as the correction coefficient C (step S50'). That is, the first correction coefficient C1 is calculated by assigning the value of the first present temperature T21 to "T2" in the equation (2) indicated above. After step S50', the correction portion 24 calculates the first OT fuel increase control correction factoring-in value D21 (step S60'). In this way, the first OT fuel increase control correction factoring-in value D21 corresponding to the first present temperature T21 is calculated.

After step S60', the comparison portion 23 determines whether the first OT fuel increase control correction factoring-in value D21 is larger than the OT fuel increase control base value D1 and whether the present temperature T21 is higher than the convergence temperature T1 (step S70'). If "No", the fuel increment setting portion 26 sets the OT fuel increment to the first OT fuel increase control correction factoring-in value D21 (step S80'). That is, the fuel increment setting portion 26 sets the OT fuel increment to the first OT fuel increase control correction factoring-in value D21 when the first present temperature T21 is equal to or lower than the convergence temperature T1 and the first OT fuel increase control correction factoring-in value D21 is equal to or smaller than the OT fuel increase control base value D1.

On the other hand, if "Yes" in step S70', that is, in at least one of a case where the first OT fuel increase control correction factoring-in value D21 is larger than the OT fuel increase control base value D1 and a case where the first present temperature T21 is higher than the convergence temperature T1, the fuel increment setting portion 26 sets the OT fuel increment to the OT fuel increase control base value D1 (step S90). As such, the OT fuel increment that is set through steps S70' to S90 as described above is a control amount that is calculated based on the present temperature T2 (i.e., the first present temperature T21), which has been obtained by the temperature obtaining portion 20, without being corrected by the present temperature correction portion 27. The control is finished after step S90.

Figure 8A:
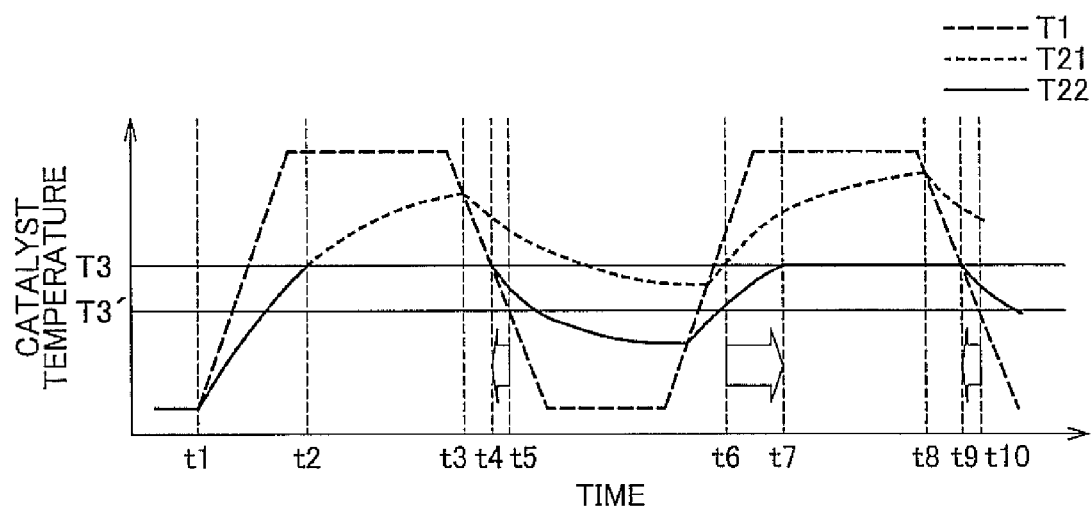
FIG. 8A is a timing chart illustrating, by way of example, a relation between time and the catalyst temperature.
Figure 8B:
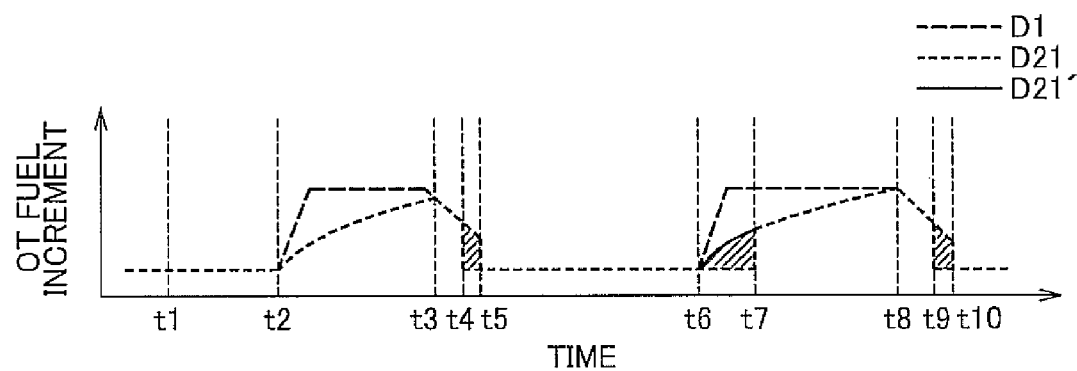
FIG. 8B is a timing chart illustrating, by way of example, a relation between time and the OT fuel increment.

Next, the flow of the above-described control will be described with reference to the timing charts of FIGS. 8A and 8B, by way of example. FIG. 8A illustrates, by way of example, a relation between time and the catalyst temperature, and FIG. 8B illustrates, by way of example, a relation between time and the OT fuel increment. In the following, only the differences from the timing charts of FIGS. 4A and 4B will be described. In FIG. 8B, part of the OT fuel increase control correction factoring-in value D2 that is used in the related-art OT fuel increase control described above with reference to FIGS. 9A and 9B is indicated as D21' for comparative reference only.

At time t2, a situation occurs where the convergence temperature T1 and the second present temperature T22 are both equal to or higher than the OT determination temperature T3. At this time, the second present temperature T22 is corrected to be equal to the OT determination temperature T3 (step S35 in FIG. 7). As a result, the deviation of the second present temperature T22 from the actual temperature of the catalyst 10 is reduced. The first OT fuel increase control correction factoring-in value D21 is used as the OT fuel increment for the period from time t2 to time t3, and then the OT fuel increase control base value D1 is used as the OT fuel increment for the period from time t3 to time t4 (steps S70', S80', and S90 in FIG. 7). In this way, the OT fuel increment is appropriately controlled.

At time t4, the convergence temperature T1 becomes lower than the OT determination temperature T3, and therefore the correction of the second present temperature T22 is finished (step S33 in FIG. 7). At time t4, further, the second present temperature T22 becomes lower than the OT determination temperature T3, and therefore the OT fuel increase control is finished (step S30 in FIG. 7). In this way, as schematically indicated by the arrow in FIG. 8A, the delay in finishing the OT fuel increase control is reduced, and thus the timing of the OT fuel increase control is optimized. More specifically, in the case of the catalyst overheat prevention apparatus of the third example embodiment, the time at which the OT fuel increase control is finished is advanced from time t5 to time t4. As a result, as shown in FIG. 8B, the surplus fuel amount corresponding to the hatched region between time t4 and time t5 can be saved at the time of executing the OT fuel increase control.

Subsequently, at time t7, a situation occurs where the convergence temperature T1 and the second present temperature T22 are both equal to or higher than the OT determination temperature T3, and therefore the OT fuel increase control is restarted (step S30 in FIG. 7). Thus, as schematically indicated by the arrow in FIG. 8A, it is possible to prevent the OT fuel increase control from being started too early even when the vehicle is accelerating again after accelerating and decelerating repeatedly, and thus the timing of the OT fuel increase control is optimized. More specifically, in the case of the catalyst overheat prevention apparatus of the third example embodiment, the time at which the OT fuel increase control is started is retarded from time t6 to time t7. As a result, as shown in FIG. 8B, the surplus fuel amount corresponding to the hatched region between time t6 and time t7 can be saved at the time of executing the OT fuel increase control. The second present temperature T22 is corrected to be equal to the OT determination temperature T3 at time t7 (step S35 in FIG. 7). Thus, the deviation of the second present temperature T22 from the actual temperature of the catalyst 10 can be kept small even when the vehicle is accelerating again.

The first OT fuel increase control correction factoring-in value D21 is used as the OT fuel increment for the period from time t7 to time t8, and the OT fuel increase control base value D1 is used as the OT fuel increment for the period from time t8 to time t9 (steps S70', S80', and S90 in FIG. 7). In this way, the OT fuel increment can be appropriately controlled even when the vehicle is accelerating or decelerating again. Further, by using the OT fuel increment that is calculated based on the first present temperature T21, an increase in the temperature of the catalyst 10, which may be caused when the OT fuel increment is made small, can be more effectively suppressed than in the first and second example embodiments, while appropriately controlling the OT fuel increment.

At time t9, the convergence temperature T1 becomes lower than the OT determination temperature T3, and therefore the correction of the second present temperature T22 is finished (step S33 in FIG. 7). At time t9, further, the second present temperature T22 becomes lower than the OT determination temperature T3, and therefore the OT fuel increase control is finished (step S30 in FIG. 7). Thus, the time at which the OT fuel increase control is finished is advanced from time t10 to time t9. That is, as schematically indicated by the arrow in FIG. 8A, the delay in finishing the OT fuel increase control is reduced also when the vehicle is decelerating again, and thus the timing of the OT fuel increase control is optimized. As a result, as shown in FIG. 8B, the surplus fuel amount corresponding to the hatched region between time t9 and time t10 can be saved at the time of executing the OT fuel increase control. As such, the catalyst overheat prevention apparatus of the third example embodiment is capable of optimizing the timing of the OT fuel increase control.

While the present temperature of the catalyst 10 and the convergence temperature of the catalyst 10 are used in the control in each of the foregoing example embodiments, the applications of the invention are not limited by this feature. For example, the temperatures of portions, parts, devices, and the like, of the exhaust system, other than the catalyst 10, such as the exhaust passage 14, an A/F (Airflow) sensor, and an oxygen sensor, may be used. Further, for example, a temperature sensor may be provided in the exhaust passage 14 and the temperature obtaining portion 20 may be adapted to obtain the temperature detected by the temperature sensor. Further, while the OT fuel increase control is executed as catalyst overheat prevention control in each of the foregoing example embodiments, the applications of the invention are not limited by this feature. For example, in a case where catalyst overheat prevention control is control that makes the exhaust air-fuel ratio richer, the ignition timing, the opening timing of the intake and exhaust valves, the intake air amount, and so on, may be changed so as to prevent overheating of the catalyst. That is, making the exhaust air-fuel ratio richer reduces the amount of oxygen in the catalyst, whereby the oxidization reactions are suppressed and thus the heat generation amount decreases, preventing overheating of the catalyst.

The invention has been described with reference to the example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

What is claimed is:

1. A catalyst overheat prevention apparatus comprising:
an electronic control unit;
the electronic control unit configured to estimate a convergence temperature on which a temperature of a catalyst provided in an exhaust system of an internal combustion engine converges;
the electronic control unit configured to estimate the temperature of the catalyst;
the electronic control unit configured to prevent overheating of the catalyst when the convergence temperature estimated by the electronic control unit and the catalyst temperature estimated by the electronic control unit are equal to or higher than a determination value; and
the electronic control unit configured to correct, during execution of the control, the estimated catalyst temperature to be equal to the determination value based on at least one of a result of comparison between the estimated convergence temperature and the estimated catalyst temperature, a result of comparison between the estimated convergence temperature and the determination value, and a result of comparison between the estimated catalyst temperature and the determination value.

2. The catalyst overheat prevention apparatus according to claim 1, wherein the electronic control unit corrects the estimated catalyst temperature to be equal to the determination value when the estimated catalyst temperature has become equal to or higher than the estimated convergence temperature.

3. The catalyst overheat prevention apparatus according to claim 1, wherein the electronic control unit corrects the estimated catalyst temperature to be equal to the determination value when the estimated catalyst temperature is equal to or higher than the determination value and the estimated convergence temperature is equal to the determination value.

4. The catalyst overheat prevention apparatus according to claim 1, wherein the electronic control unit corrects the estimated catalyst temperature to be equal to the determination value when the estimated convergence temperature is equal to or higher than the determination value and the estimated catalyst temperature is equal to or higher than the determination value.

5. The catalyst overheat prevention apparatus according to claim 1, wherein the electronic control unit calculates a control amount for the control based on the catalyst temperature that has been estimated by the electronic control unit without being corrected by the electronic control unit.

6. The catalyst overheat prevention apparatus according to claim 1, wherein the electronic control unit estimates the catalyst temperature based on the convergence temperature estimated by the electronic control unit.

7. The catalyst overheat prevention apparatus according to claim 1, wherein:
the control for preventing overheating of the catalyst is OT fuel increase control;
the electronic control unit configured to calculate an OT fuel increase control base value, the electronic control unit configured to calculate an OT fuel increase control correction factoring-in value by correcting the OT fuel increase control base value based on the estimated convergence temperature and the estimated catalyst temperature, and the electronic control unit configured to compare the estimated convergence temperature and the estimated catalyst temperature with each other and the electronic control unit compares the OT fuel increase control base value and the OT fuel increase control correction factoring-in value with each other; and the electronic control unit corrects the estimated catalyst temperature to be equal to the determination value in at least one of a case where the estimated catalyst temperature is higher than the estimated convergence temperature and a case where the OT fuel increase control correction factoring-in value is larger than the OT fuel increase control base value.

8. The catalyst overheat prevention apparatus according to claim 7, wherein the electronic control unit executes the OT fuel increase control using the OT fuel increase control correction factoring-in value when the estimated catalyst temperature is equal to or lower than the estimated convergence temperature.

9. A catalyst overheat prevention control method comprising:
  estimating a convergence temperature on which a temperature of a catalyst provided in an exhaust system of an internal combustion engine converges;
  estimating the temperature of the catalyst;
  executing control for preventing overheating of the catalyst when the estimated convergence temperature and the estimated catalyst temperature are equal to or higher than a determination value; and
  correcting, during execution of the control, the estimated catalyst temperature to be equal to the determination value based on at least one of a result of comparison between the estimated convergence temperature and the estimated catalyst temperature, a result of comparison between the estimated convergence temperature and the determination value, and a result of comparison between the estimated catalyst temperature and the determination value.

10. The catalyst overheat prevention control method according to claim 9, wherein
  the correction of the estimated catalyst temperature is made when the estimated catalyst temperature is equal to or higher than the determination value and the estimated convergence temperature is equal to the determination value.

* * * * *

UNITED STATES PATENT AND TRADEMARK OFFICE
CERTIFICATE OF CORRECTION

PATENT NO. : 8,713,915 B2  
APPLICATION NO. : 13/179234  
DATED : May 6, 2014  
INVENTOR(S) : Masahiro Kachi et al.

Page 1 of 1

It is certified that error appears in the above-identified patent and that said Letters Patent is hereby corrected as shown below:

In the Claims:

At column 16, claim number 1, line number 10,

Please delete "electroniccontrol", Insert --electronic control--

Signed and Sealed this  
Twenty-third Day of December, 2014

Michelle K. Lee  
*Deputy Director of the United States Patent and Trademark Office*